United States Patent [19]

Mussman

[11] 3,821,486

[45] June 28, 1974

[54] BRIDGE-TYPE SUPERVISORY DETECTOR WITH REDUCED BREAKDOWN VOLTAGE REQUIREMENTS

[75] Inventor: Harry Edward Mussman, Darien, Ill.

[73] Assignee: Bell Telephone Laboratories, Incorporated, Murray Hill, N.J.

[22] Filed: June 22, 1973

[21] Appl. No.: 372,815

[52] U.S. Cl. .......................................... 179/18 FA
[51] Int. Cl. .......................................... H04m 3/22
[58] Field of Search ................ 179/18 F, 18 FA, 84; 307/235

[56] References Cited

UNITED STATES PATENTS

| | | | |
|---|---|---|---|
| 3,156,778 | 11/1964 | Cirone | 179/18 FA |
| 3,478,175 | 11/1969 | Herter | 179/18 FA |
| 3,515,809 | 6/1970 | Herter | 179/18 FA |
| 3,525,816 | 8/1970 | Herter | 179/18 FA |
| 3,529,098 | 9/1970 | Chapman | 179/18 F |
| 3,546,392 | 12/1970 | Herter | 179/18 FA |
| 3,622,709 | 11/1971 | Tjaden | 179/18 F |
| 3,673,356 | 6/1972 | Herter | 179/18 FA |
| 3,748,395 | 7/1973 | Herter | 179/18 FA |
| 3,781,571 | 12/1973 | Lord | 179/18 FA |

*Primary Examiner*—Thomas A. Robinson
*Attorney, Agent, or Firm*—R. B. Ardis

[57] ABSTRACT

A bridge-type supervisory detector for communication lines is provided with transistor circuits connected to each cross-arm of the bridge which provide output currents dependent upon the voltages of the respective line conductors. The breakdown voltage requirements placed on the detector itself and upon the differential amplifier which follows are thereby reduced and both may be fabricated readily and inexpensively with presently existing thin film and integrated circuit techniques.

8 Claims, 2 Drawing Figures

BRIDGE-TYPE SUPERVISORY DETECTOR WITH REDUCED BREAKDOWN VOLTAGE REQUIREMENTS

BACKGROUND OF THE INVENTION

This invention relates generally to automatic telephone switching systems and more particularly to supervisory detector circuits for monitoring the operative states of subscriber lines served by such systems.

In the so-called subscriber loop telephone plant, direct current signaling is typically employed to indicate to the central office switching equipment whether a subscriber line is idle or busy, to initiate service requests, and to transmit called number information in the form of dial pulses. With such signaling, each subscriber line loop is opened to indicate an idle condition, closed to indicate a busy condition or a request for service, or closed and opened in sequence to indicate dial pulses. Each time the loop is closed, direct signaling current from the central office supply flows in the loop, the magnitude of the signaling current depending principally upon the loop resistance.

In order to detect signaling information received in the central office, an automatic telephone switching system normally requires supervisory detector circuits. Such detector circuits typically function by determining whether the direct signaling current in a subscriber line loop is greater than or less than a predetermined threshold, classifying signaling current above the threshold as indicating the closed-loop state and signaling current below the threshold as representing the open-loop state. For the detection of telephone dial pulses, the detector circuit needs also to follow transitions between the closed-loop and open-loop states with sufficient speed and accuracy to provide accurate digit registration.

In the past, most supervisory detector circuits have used relays or other electromagnetic devices. Although such devices have a very broad range of utility because of their tolerances to wide ranges of voltage to which differences in loop resistance cause them to be subjected, there has been a recent tendency to prefer all-electronic detector circuits in order to take advantage of the cost and space saving afforded by modern thin film and integrated circuit technology. Simple replacement of electromagnetic devices with active solid state devices creates a new problem in many applications, however, in that the breakdown voltages of the least expensive and most readily available active integrated circuit devices tend to be too low for the dynamic voltage ranges encountered.

One past approach to an all-electronic supervisory detector circuit is the hexa-pole bridge circuit shown in U.S. Pat. No. 3,525,816, which issued Aug. 25, 1970, to E. Herter. In the Herter circuit, the line conductors of the communication path being monitored are connected to opposite sides of the central office battery through respective resistance or other impedance elements in normal fashion. To complete the bridge, a pair of resistances are connected in series from each line conductor to form a cross-arm to the opposite side of the central office direct voltage source. The output of the bridge appears between the two terminals defined by the junctions between each pair of series cross-arm resistances and is typically applied to a transistor differential amplifier. Even this bridge approach to an all-electronic supervisory detector circuit is limited in some applications, however, by the remaining tendency of the dynamic voltage ranges encountered to be greater than the breakdown voltages of the transistors which would otherwise be most desirable for use in the differential amplifier.

SUMMARY OF THE INVENTION

The present invention takes the form of a bridge-type supervisory detector circuit for monitoring the operative state of a communication path with circuitry connected to each cross-arm of the bridge for producing output currents dependent upon the voltages on the respective line conductors of the communication path. This circuitry substantially reduces the dynamic voltage range at the bridge output and, by so doing, makes it possible to fabricate both the bridge itself and the differential amplifier which follows it readily and inexpensively with presently existing thin film and integrated circuit techniques.

More specifically, in accordance with the invention, a supervisory detector for monitoring the operative state of a communication path which includes a pair of line conductors, a direct voltage source, and a pair of feed impedances connecting respective line conductors to opposite sides of the voltage source includes a pair of circuit paths cross-connected from respective line conductors to the other sides of the voltage source to form a bridge circuit with the feed impedances, each of the circuit paths including a pair of resistances one of which has an exterior end connected to the line conductor and the other of which has an exterior end connected to the voltage source, a common output terminal, and circuit means both to maintain the interior ends of the resistances at substantially constant potentials and to provide at the common output terminal a current dependent upon the voltage at the line conductor end of the circuit path, and means energized in response to a difference between currents at the common output terminals for generating an output indicative of the operative state of the communication path.

In at least one important embodiment of the invention, the indicated circuit means in each of the cross-connected circuit paths includes a transistor having its emitter connected to the interior ends of both resistances, its collector connected to the common output terminal, and its base connected to a direct voltage source. In others, the indicated circuit means includes a pair of transistors having their emitters connected to the interior ends of respective ones of the resistances, their collectors connected to the common output terminal, and their bases connected to a direct voltage source.

DETAILED DESCRIPTION

Figure 1:
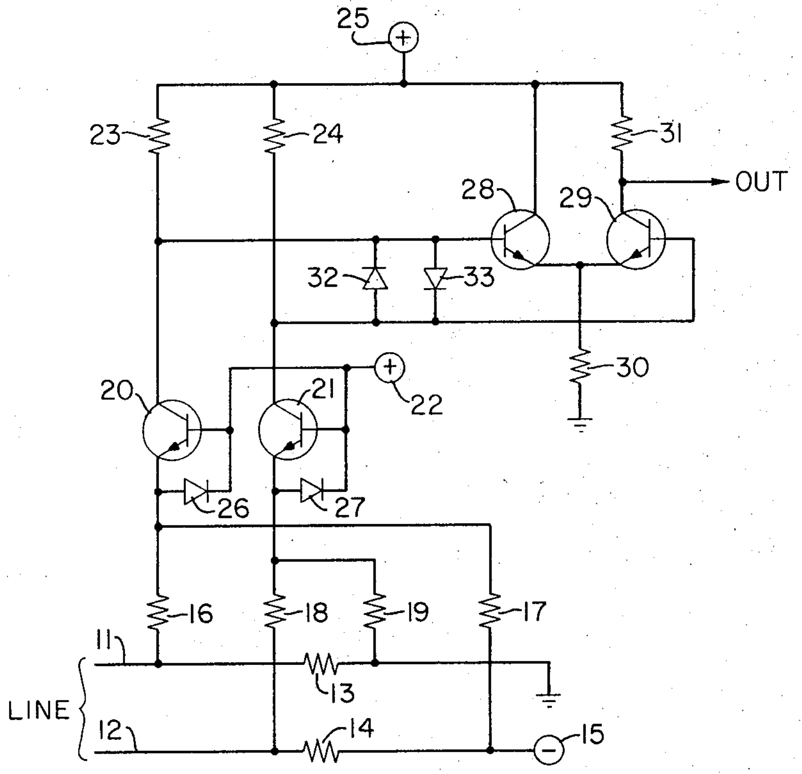
FIGS. 1 and 2 are schematic diagrams of alternative supervisory detector circuits embodying the invention.

In FIG. 1, the communication path to be monitored may, by way of example, be a subscriber telephone line composed of a pair of line conductors 11 and 12 connected to the so-called central office battery through respective feed resistances 13 and 14. As shown, resistance 13 is connected to the positive terminal, i.e., ground, and resistance 14 is connected to the negative terminal 15. A hexa-pole bridge is formed with feed resistances 13 and 14 by a pair of circuit paths, one of which includes a pair of resistances 16 and 17 connected in sequence from line conductor 11 to negative terminal 15 and the other of which includes a pair of similar resistances 18 and 19 connected in sequence from line conductor 12 to ground.

In the embodiment of the invention shown in FIG. 1, an *n-p-n* transistor 20 has its emitter connected to the junction of the interior ends of resistances 16 and 17, the exterior ends of which are connected to line conductor 11 and negative terminal 15, respectively. A similar *n-p-n* transistor 21 has its emitter connected to the junction of the interior ends of resistances 18 and 19, the exterior ends of which are connected to line conductor 12 and ground, respectively. The bases of both of transistors 20 and 21 are connected to a positive direct voltage source 22 and the collectors of transistors 20 and 21 are connected through respective resistances 23 and 24 to a positive direct voltage source 25. Source 25 provides collector voltages at both transistors 20 and 21 which are more positive than the base voltages provided by source 22, causing both collector-base junctions to be reverse biased. Because source 22 is more positive than either ground or negative terminal 15, both emitter-base junctions receive a continuous forward bias. A pair of diodes 26 and 27 are connected across the emitter-base junctions of transistors 20 and 21, respectively, to protect those junctions from reverse bias due to positive-going lightning surges on line conductors 11 and 12. As illustrated, diodes 26 and 27 are poled oppositely from the emitter-base junctions of transistors 20 and 21.

The output from the collectors of transistors 20 and 21 in FIG. 1 is applied to a differential amplifier which may include, by way of example, a pair of *n-p-n* transistors 28 and 29, a common emitter resistance 30, and a collector resistance 31 for transistor 29. As shown, the collector of transistor 20 is connected to the base of transistor 28 and the collector of transistor 21 is connected to the base of transistor 29. The emitters of differential amplifier transistors 28 and 29 are connected together and returned to ground through common emitter resistance 30. The collector of transistor 28 is connected directly to positive direct voltage source 25 and the collector of transistor 29 is connected to positive direct voltage source 25 through resistance 31. The collector of transistor 29 serves as the output terminal of the differential amplifier. Finally, a pair of oppositely poled diodes 32 and 33 are connected in parallel between the bases of differential amplifier transistors 28 and 29 to protect the emitter-base junctions of those transistors from reverse breakdown and to clamp the maximum differential voltage to the forward conducting threshold of the diodes.

Although all of transistors 20, 21, 28, and 29 in the embodiment of the invention illustrated in FIG. 1 are shown as single *n-p-n* transistors, each may, if desired, be a compound or Darlington pair to assure effective values of transistor $\alpha$ more nearly equal to unity.

The hexa-pole bridge formed by resistances 13, 14, 16, 17, 18, and 19 in the embodiment of the invention shown in FIG. 1 operates in the general manner of its predecessors by applying an output of one polarity to the differential amplifier when the subscriber line is terminated by an open circuit and an output of the opposite polarity when the subscriber line is terminated by a short circuit. There is a polarity reversal for a critical value of terminating impedance intermediate between the two extremes. Because of the balanced nature of the bridge, the critical value of terminating impedance is unaffected by longitudinal currents on the line, although longitudinal currents do result in a common node signal which is applied to the differential amplifier.

Absent the invention, the bridge in FIG. 1 would apply an output to the differential amplifier which could have a dynamic range far in excess of the breakdown voltages of the transistors which are most readily available in integrated circuit form, i.e., *n-p-n* transistors with breakdown voltages of only around 25 volts. It is possible, of course, to use discrete transistors with higher breakdown voltages, but such devices tend to be considerably more expensive.

The present invention permits both the hexa-pole bridge and the differential amplifier to be fabricated simply and inexpensively with presently existing thin film and integrated circuit technology. In the embodiment illustrated in FIG. 1, the voltage at the base of each of transistors 20 and 21 is fixed at that of source 22. The voltage at each emitter is thus fixed at the same voltage less the forward conducting threshold of the emitter-base junction, about 0.7 volt. The current at each emitter is equal to the sum of two currents, one of which is proportional to the voltage across the resistance connected from it to the respective one of line conductors 11 and 12 and the other of which is proportional to the voltage across the resistance connected from it to the respective one of terminal 15 and ground. Thus the current at the emitter of transistor 20 is the sum of a current proportional to the voltage across resistance 16 and a current proportional to the voltage across resistance 17, while that of the emitter of transistor 21 is the sum of a current proportional to the voltage across resistance 18 and a current proportional to the voltage across resistance 19. The voltages at the emitters of transistors 20 and 21 are fixed, as described above. Because the voltages across resistances 16 and 17 are proportional to the voltage on line conductor 11 and that at terminal 15, respectively, the currents summed at the emitter of transistor 20 are proportional to the voltage on line conductor 11 and that at terminal 15, respectively. Similarly, because the voltages across resistances 18 and 19 are proportional to the voltage on line conductor 12 and that at office battery ground, respectively, the currents summed at the emitter of transistor 21 are proportional to the voltage on line conductor 12 and that at office battery ground, respectively. In each of transistors 20 and 21, the emitter and collector currents are substantially equal. Under normal operating conditions, the voltages at both terminals of the central office battery are, furthermore, substantially constant. The current at the collector of transistor 20 is, therefore, primarily dependent upon the voltage on line conductor 11 and the current at the collector of transistor 21 is primarily dependent upon the voltage on line conductor 12. In this manner, transistors 20 and 21 and their associated circuitry convert voltage variations on line conductors 11 and 12 to current variations at their collectors. Collector resistances 23 and 24 are small relative to resistances 16, 17, 18, and 19 and, as a result, the voltage variations presented to the input of the differential amplifier are small and well within the breakdown range of *n-p-n* integrated circuit transistors.

Figure 2:
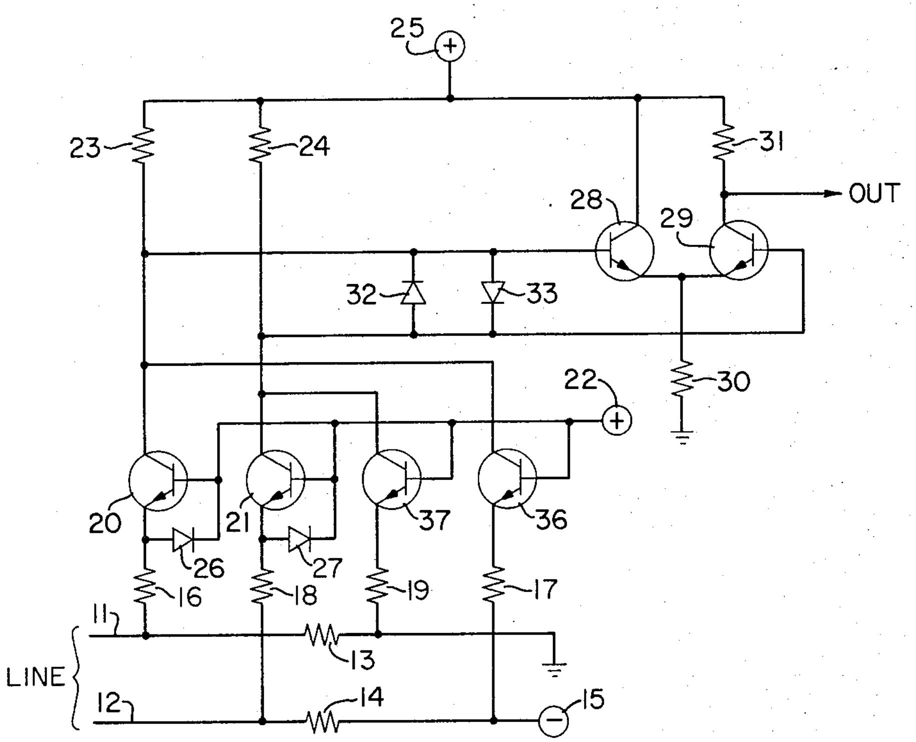

An adaptation of the supervisory detector circuit shown in FIG. 1 using separate transistors for each of the resistances 16, 17, 18, and 19 takes the form illustrated schematically in FIG. 2.

The embodiment of the invention illustrated in FIG. 2 is like that shown in FIG. 1 except that it includes two additional *n-p-n* transistors 36 and 37. In FIG. 2, transistors 20 and 36 perform separately for bridge resistances 16 and 17 the function that transistor 20 performs for them together in FIG. 1 and transistors 21 and 37 bear the same relationship to bridge resistances 18 and 19. The current summing function, instead of being performed at the emitters of transistors 20 and 21 as in FIG. 1, is performed at their collectors where they are joined by the respective collectors of transistors 36 and 37. As shown, the interior end of resistance 17 is connected to the emitter of transistor 36 and that of resistance 19 is connected to the emitter of transistor 37. The bases of both transistors 36 and 37 are connected to positive direct voltage source 22. The collector of transistor 36 is connected to that of transistor 20 and the collector of transistor 37 is connected to that of transistor 21.

What is claimed is:

1. A supervisory detector for monitoring the operative state of a communication path which includes a pair of line conductors, a source of direct potential, and a pair of feed impedances connecting respective ones of said line conductors to opposite sides of said source, said detector comprising a pair of circuit paths cross-connected from respective ones of said line conductors to the other sides of said source thereby forming a bridge circuit with said feed impedances, each of said circuit paths including a pair of resistances one of which has an exterior end connected to said line conductor and an interior end and the other of which has an exterior end connected to said source and an interior end, a common output terminal, and circuit means both to maintain the interior ends of said resistances at substantially constant potentials and to provide at said common output terminal a current dependent upon the voltage at the line conductor end of said circuit path, and means energized in response to a difference between currents at said common output terminals for generating an output indicative of the operative state of said communication path.

2. A supervisory detector in accordance with claim 1 in which, in each of said circuit paths, the current at said common output terminal is the sum of a current proportional to the voltage at the line conductor end of the circuit path and a current proportional to the voltage at the source end of the circuit path.

3. A supervisory detector in accordance with claim 1 in which said circuit means includes at least one transistor having its emitter connected to the interior end of one of said resistances, its collector connected to said common output terminal, and its base connected to a source of direct potential.

4. A supervisory detector in accordance with claim 3 in which the base of said transistor is connected to a source of direct potential biasing the emitter-base junction of said transistor in the forward direction and the collector of said transistor is connected to a source of direct potential biasing the collector-base junction of said transistor in the reverse direction.

5. A supervisory detector in accordance with claim 1 in which said circuit means includes a transistor having its emitter connected to the interior ends of both of said resistances, its collector connected to said common output terminal, and its base connected to a source of direct potential.

6. A supervisory detector in accordance with claim 5 in which the base of said transistor is connected to a source of direct potential biasing the emitter-base junction of said transistor in the forward direction and the collector of said transistor is connected to a source of direct potential biasing the collector-base junction of said transistor in the reverse direction.

7. A supervisory detector in accordance with claim 1 in which said circuit means includes a pair of transistors having their emitters connected to the interior ends of respective ones of said resistances, their collectors connected to said common output terminal, and their bases connected to a source of direct potential.

8. A supervisory detector in accordance with claim 7 in which the bases of said transistors are connected to a source of direct potential biasing the emitter-base junctions of said transistors in the forward direction and the collectors of said transistors are connected to a source of direct potential biasing the collector-base junctions of said transistors in the reverse direction.

* * * * *